Patented May 18, 1937

2,080,770

UNITED STATES PATENT OFFICE 2,080,770

TOXIC AGENTS

Stefan Goldschmidt, Karlsruhe, and Karl Martin, Bruchsal, Germany, assignors to the firm Kessler Chemical Corporation, New York, N. Y.

No Drawing. Application December 13, 1934, Serial No. 757,377. In Germany December 27, 1933

3 Claims. (Cl. 167—30)

This invention is based on the discovery that aromatic isothiocyanates, in which the isothiocyanate radical is directly bound with the aromatic nucleus, and substituted products of these isothiocyanates in which the isothiocyanate radical itself may be the substituent and also certain aromatic isothiocyanates substituted in a lateral non-acylic branch, possess extremely effective toxic properties against fish and insects. Aromatic isothiocyanates have been found to be particularly effective, which contain more than one isothiocyanate radical.

Among the compounds suitable for my invention are: phenyl-isothiocyanate, chlorphenyl-isothiocyanate, p-oxyphenyl-isothiocyanate, m- and p-phenylene-di-isothiocyanate, toluylene-di-isothiocyanate, chlorphenylene-di-isothiocyanate, nitro-phenyl-isothiocyanate, benzyl-isothiocyanate, and xylylene-di-isothiocyanate.

As compared with aliphatic isothiocyanates the aromatic isothiocyanates according to the invention are distinguished by a considerably greater toxic effect against fish and insects, and from a technical point of view are also cheaper to produce. In comparison with the corresponding thiocyanates the isothiocyanates are much more effective, and in particular have a more rapid effect, and do not possess a disagreeable odour and offer greater resistance to saponifying agents.

Thus, for example, a solution of .5 mg. p-phenylene di-isothiocyanate in 1 litre of water after standing for three days at ordinary room temperature does not reveal any decrease in the toxic effect on goldfish.

Thiocyanates also reveal unpleasant physiological effects, and more particularly a biting effect, on the human skin, which is not the case in connection with the isothiocyanates according to the invention. The latter do also not act detrimentally on plants.

They may be employed in desired fashion, for example by spraying on in conjunction with the usual diluting and moistening agents in the form of solutions and emulsions, or by application in powdered form, preferably after admixing a pulverulent diluting agent. The solutions, emulsions or powders may contain the effective agent in a very diluted state. They may also be employed in mixture with other, known insecticides, more particularly nicotine, derris extract or rotenone, in which connection there is obtained a surprising effect greatly exceeding a mere aggregation.

The following examples will serve to explain the invention:

A. Experiments with fish

| Substance | Concentration of the fatal dose in water for goldfish, in % | Dead after |
|---|---|---|
| | | Hours |
| Phenylisothiocyanate | .0005 | 1½ |
| m- and p-phenylene-di-isothiocyanate | .00001 | 6 |
| 4-chlor-1.3-phenylene-di-isothiocyanate | .00001 | 3 |
| 1,2,4-toluylene-di-isothiocyanate | .000025 | 4 |
| m-chlorphenylisothiocyanate | .00005 | 3 |
| p-nitrophenylisothiocyanate | .00005 | 2¼ |
| p-oxyphenylisothiocyanate | .000025 | 14 |
| Alpha-naphthylisothiocyanate | .00005 | 2¾ |
| Benzyl-isothiocyanate | .0001 | 5 |
| m-xylylene-di-isothiocyanate | .00005 | 5 |
| | .00005 | 2½ |

B. Experiments on plants

1. A solution, containing in addition to a moistening agent .05% m-phenylene di-isothiocyanate in water, was sprayed on to an apple tree attacked by tree lice. The leaves did not burn. Approximately 50–60% of the lice were dead after two days.

2. In a similar experiment with a .04% solution on an apple tree attacked by greenfly 50–60% were killed.

As an example of the fact that isothiocyanates retain their effectiveness also in mixture with other toxic agents reference may be made to the following:

3. A solution was produced in water containing, in addition to a moistening agent, .05% m-phenylene di-isothiocyanate and .05% nicotine. An apple-tree attacked by tree lice and sprayed with this substance did not burn, whilst all lice had been exterminated after two days.

The toxic nature of phenylene di-isothiocyanates was also tested with regard to other cold-blood life. Thus, for example, chaetopods and tupifex worms were killed in 1½ hours when placed in a solution of 1 mg. p-phenylene-di-isothiocyanate in 1 litre water. If the vapor pressure of m-phenylene di-isothiocyanate is increased by heating beyond 30–35° C., it acts as a breathing poison. Gnats are killed after a few seconds, and in the case of meal-worms this takes place after approximately 15 minutes.

What we claim as new and desire to secure by Letters Patent is:

1. As an insecticide a preparation comprising as an active constituent an aromatic isothiocyanate in which the isothiocyanate radical is directly attached to an aromatic nucleus.

2. As an insecticide a preparation comprising phenyl-isothiocyanate.

3. As an insecticide a preparation comprising phenylene-di-isothiocyanate.

STEFAN GOLDSCHMIDT.
KARL MARTIN.